United States Patent
Neumann et al.

(10) Patent No.: US 10,336,244 B2
(45) Date of Patent: Jul. 2, 2019

(54) ARRANGEMENT AND METHOD FOR PRODUCING AN ASYMMETRICAL, GLARE-FREE HIGH-BEAM

(71) Applicant: Varroc Lighting Systems, s.r.o., Senov u Noveho Jicina (CZ)

(72) Inventors: Rainer Neumann, Stuttgart (DE); Vladimír Kuběna, Bernartice nad Odrou (CZ)

(73) Assignee: Varroc Lighting Systems, s.r.o., Senov u Noveho Jicina (CZ)

( * ) Notice: Subject to any disclaimer, the term of this patent is extended or adjusted under 35 U.S.C. 154(b) by 0 days.

(21) Appl. No.: 16/133,895

(22) Filed: Sep. 18, 2018

(65) Prior Publication Data
US 2019/0084471 A1    Mar. 21, 2019

(30) Foreign Application Priority Data
Sep. 19, 2017  (DE) ......................... 10 2017 121 662

(51) Int. Cl.
| | |
|---|---|
| *B60Q 1/14* | (2006.01) |
| *F21S 41/663* | (2018.01) |
| *F21S 41/141* | (2018.01) |
| *G06K 9/00* | (2006.01) |
| *H04N 5/232* | (2006.01) |

(52) U.S. Cl.
CPC ............ *B60Q 1/143* (2013.01); *F21S 41/141* (2018.01); *F21S 41/663* (2018.01); *G06K 9/00798* (2013.01); *B60Q 2300/056* (2013.01); *B60Q 2300/41* (2013.01); *B60Q 2300/42* (2013.01); *G06K 2209/23* (2013.01); *H04N 5/232* (2013.01)

(58) Field of Classification Search
None
See application file for complete search history.

(56) References Cited

U.S. PATENT DOCUMENTS

| | | | |
|---|---|---|---|
| 8,270,676 B2 | 9/2012 | Heinrich et al. | |
| 8,538,636 B2 * | 9/2013 | Breed | B60N 2/002 |
| | | | 315/77 |
| 9,278,644 B2 | 3/2016 | Lee | |
| 9,873,372 B2 * | 1/2018 | Son | B60Q 1/1423 |

(Continued)

FOREIGN PATENT DOCUMENTS

| | | |
|---|---|---|
| DE | 19713884 A1 | 10/1998 |
| DE | 10151514 A1 | 4/2003 |

(Continued)

*Primary Examiner* — Dedei K Hammond
(74) *Attorney, Agent, or Firm* — Ursula B. Day

(57) ABSTRACT

An arrangement for producing a glare-free high-beam for vehicles is disclosed with headlights, which have a plurality of LEDs controllable by an ADB control and regulating unit and that a front camera is provided which is connected with the ADB control and regulating unit and which is designed to transmit information about oncoming and/or preceding vehicles to the ADB control unit, the arrangement being characterized in that the headlights are designed to generate an ADB illumination area asymmetrically only for an area of the own lane and that the headlights are designed to generate for an area of the oncoming lane only a low-beam area and a high-beam area. A method for producing an asymmetrical, glare-free high-beam is also disclosed.

6 Claims, 6 Drawing Sheets

(56) References Cited

U.S. PATENT DOCUMENTS

2014/0246975 A1* 9/2014 Futamura ............... B60Q 1/143
                                                    315/82
2014/0307456 A1   10/2014 Ishida et al.

FOREIGN PATENT DOCUMENTS

DE    102006055908 A1    5/2008
DE    102014207013 A1    10/2014

* cited by examiner

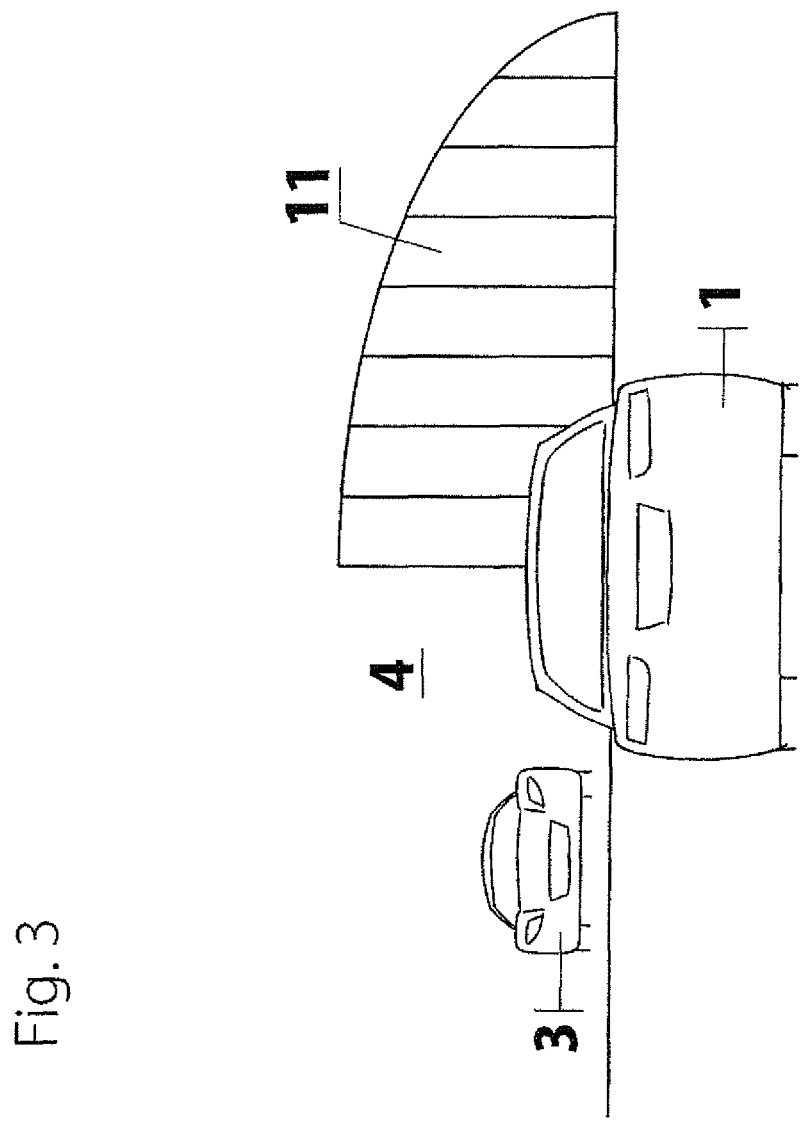

ARRANGEMENT AND METHOD FOR PRODUCING AN ASYMMETRICAL, GLARE-FREE HIGH-BEAM

CROSS-REFERENCES TO RELATED APPLICATIONS

This application claims the priority of German Patent Application Serial No. 10 2017 121 662.6, filed Sep. 19, 2017, pursuant to 35 U.S.C. 119(a)-(d), the subject matter of which is incorporated herein by reference.

BACKGROUND OF THE INVENTION

The invention relates to an arrangement and a method for producing an asymmetrical, glare-free high-beam for the headlights of vehicles.

In modern vehicles, various functions are used in the lighting systems in order to provide better visibility for drivers even in the peripheral area of the road or with oncoming vehicles. The function of the glare-free high-beam, also referred to as Adaptive Driving Beam, ADB, reduces interference with other, especially oncoming road users, and thus protects better from accidents.

These intelligent headlight functions are implemented much more easily with LED technology than with previous mechanical systems.

Vehicle lighting systems with ADB function are known in the art. For example, DE 10 2014 207 013 A1 discloses a vehicle lamp which includes a light distribution pattern control unit, a pan control unit, a leveling control unit, and an ADB control device. The light distribution pattern controller changes and controls a light distribution pattern of the lamp. The pan control unit deflects and controls an optical axis of the lamp in a right and left direction. The leveling control unit controls the optical axis of the light in an up and down direction.

Furthermore, an ADB headlight system and a method for controlling beams using an ADB headlight system is known from U.S. Pat. No. 9,278,644 B2, wherein the ADB headlight system has an ADB headlight installed in a vehicle; a power unit that drives the ADB headlight; a road condition detecting unit and a controlling unit that controls the unit for driving, in order to allow the ADB headlight to radiate a beam below a horizontal line in accordance with a signal generated from road condition information generated by the unit for detecting road conditions is obtained. Thereby, a beam is provided which suppresses blinding of an oncoming vehicle and blinding of a vehicle ahead and minimizes fatigue of a driver of the traveling vehicle by detecting road conditions.

From DE 10 2006 055 908 A1 a method for automatic high-beam control is known. In this case, the environment in front of the vehicle is monitored with a camera sensor, and a sequence of images of the vehicle surroundings is recorded in front of the vehicle, with preceding and oncoming vehicles being detected. The headlights are subsequently controlled so that drivers of other vehicles are not blinded.

The known vehicle lighting systems with the ADB function have the disadvantage that, for example, 80 or more LEDs must be used to implement the ADB function. The sensor technology, the number of sensors and the control and regulation methods for implementing the ADB function are very complex, so that these pioneering headlight functions are relatively expensive and therefore not available for all vehicles for cost reasons.

It would therefore be desirable and advantageous to provide an improved system with ADB function to obviate prior art shortcomings and to provide a cost-effective glare-free headlight beam

SUMMARY OF THE INVENTION

It is thus an object of the invention is to provide an arrangement and a method for producing a glare-free high-beam for vehicles, which provide the desired functionality of glare-free high-beam with lower cost and control complexity.

In particular, this is achieved by an arrangement and a method for generating a glare-free high-beam for vehicles with headlights having several LEDs that can be controlled by an ADB regulating and control unit, wherein the arrangement is characterized in that a front camera which is connected with the ADB regulating and control unit is provided and which is configured to transmit to the ADB regulating and control unit information about oncoming and/or preceding vehicles. The headlights are asymmetrically designed to generate an ADB illumination area only for an area of their own lane. Furthermore, the front headlights constructed to generate for a range of the oncoming lane only a low-beam area and a high-beam area.

With such an arrangement, it is possible to control the LEDs of the headlights in dependence on the information about, for example, oncoming vehicles such that the ADB illumination area is generated only in the area of one's own lane, whereas in the area of the oncoming lane low-beam from the correspondingly driven LEDs is provided glare-free for the oncoming vehicle. In the area of own lane, the ADB mode for controlling the LEDs is maintained, so that, the functionality of the glare-free high-beam continues to exist also in this area.

The asymmetrical ADB functionality is based on the concept that the increased technical complexity for the ADB functionality is used only for the area of the own traffic lane, whereas in the area of the oncoming traffic lane the standard high-beam and low-beam area is realized.

Particularly advantageously, a camera, which is designed to capture 25 to 50 frames per second, is used for controlling the ADB and for switching to high-beam and low-beam.

Preferably, the number of LEDs in the headlights for the area of the oncoming lane to be illuminated is reduced to half compared to the number of LEDs required to illuminate the area of the own lane.

One of the objects of the invention is achieved by a method for generating asymmetric, glare-free high-beam for vehicles with headlights, wherein the LEDs for the oncoming lane and the own lane of the road are regulated and controlled separately. In particular, the headlights are designed so that they can be separately switched to high-beam and low-beam.

With oncoming vehicles detected by the front camera, the oncoming lane is switched to low-beam according to the concept of the asymmetrical glare-free high-beam, and the own lane is, however, remains in high-beam and in the ADB mode.

Cumulative or alternatively, with vehicles driving ahead and detected by the front camera, the own lane is switched to low-beam and the oncoming lane is switched to high-beam, with the own lane remaining in ADB mode.

If no vehicles are detected by the front camera, both lanes are switched to high-beam, with the own lane remaining in the ADB mode.

According to an advantageous embodiment of the invention, the function of the asymmetrical glare-free high-beam is combined with the function of the adaptive cornering light, also referred to as AFS (Adaptive Front-Lighting System), so that even when cornering, the correspondingly high-beam and low-beam areas of the lanes are preserved.

According to a further advantageous embodiment of the invention, when cornering towards the oncoming lane, the ADB function for the own lane is switched off, while switching back to low-beam. The switch back to low-beam takes place from a predetermined curve radius on. Thus, the ADB high-beam illuminating the own lane can be switched off, thereby saving energy and preventing environmental damage due to relatively strong ADB light.

Particularly preferably, information from a navigation system is included for controlling and regulating the light. In this way, the direction and the curve radius for cornering are known in advance and are included in the control. For a curve in the direction of the own lane, the AFS cornering light is implemented, whereas for a curve in the direction of the oncoming lane, ADB for the corresponding wing is switched off and switched to standard low-beam. The switch-off and switch-over depend on the GPS signals and optionally the vehicle speed.

With the concept of the asymmetrical glare-free high-beam, the function of the ADB is limited to the own lane and is thus formed asymmetrically. The oncoming lane is not illuminated with the additional high-beam of the ADB, but is only supplied with standard low-beam and high-beam headlights. The asymmetrical design of the ADB function leads to significant savings in required number of LEDs for the headlights of the vehicles.

It is particularly advantageous with the inventive concept that a reduced number of LEDs can be used and that the software for controlling the LEDs can be made less complex and thus less susceptible to interference, and more robust.

Further details, features and advantages of embodiments of the invention will become apparent from the following description of exemplary embodiments with reference to the accompanying drawings, wherein:

BRIEF DESCRIPTION OF THE DRAWING

FIG. 3: Asymmetrical ADB in the low-beam mode.

DETAILED DESCRIPTION OF PREFERRED EMBODIMENTS

Figure 1A:
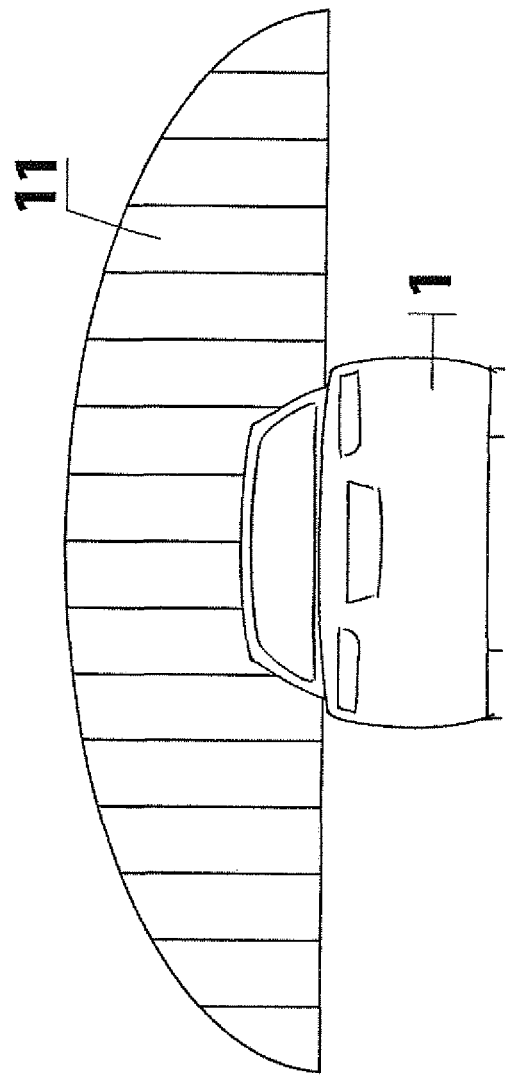
FIG. 1A: shows an ADB function according to the prior art in a view in the direction of travel.

FIG. 1A shows an ADB illumination area 11 of a vehicle 1 as seen in the direction of travel according to the prior art. The vertical hatching of the area indicates the ADB functionality over the entire illuminated area.

Figure 1B:
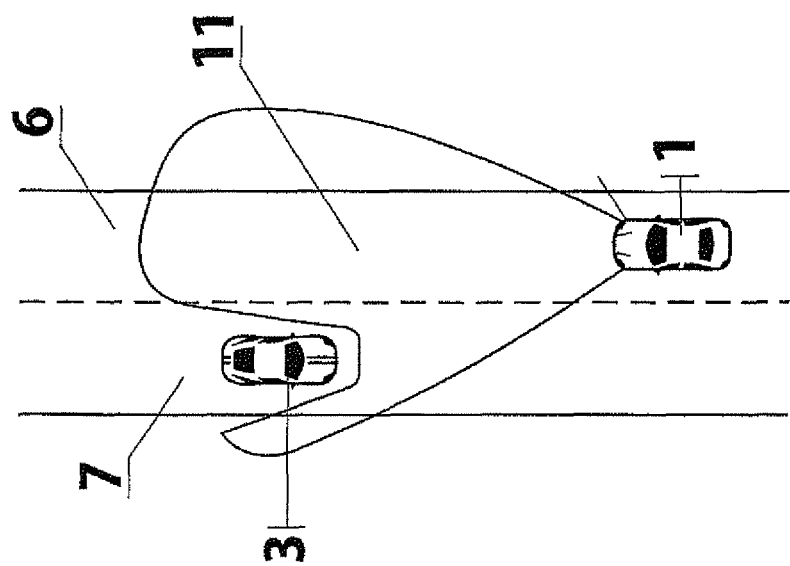
FIG. 1B: shows the ADB function according to the prior art in plan view.

In FIG. 1B, the ADB illumination area 11 of the vehicle 1 is shown in plan view from above onto the road, consisting of the own lane 6 of the vehicle 1 and the oncoming lane 7 of the oncoming vehicle 3 according to the prior art. The double-winged area of the ADB illumination area 11 in the top view is in the area of the oncoming vehicle 3 and behind the oncoming vehicle 3 devoid of the stronger light due to the ADB functionality, thereby minimizing a blinding effect on the driver of the oncoming vehicle 3. The illumination area in front of the vehicle is divided into a left wing and a right wing. The advantages of the ADB functionality are thus ineffective in the area of the left wing of the ADB illumination area in the aforementioned constellation.

Figure 2:
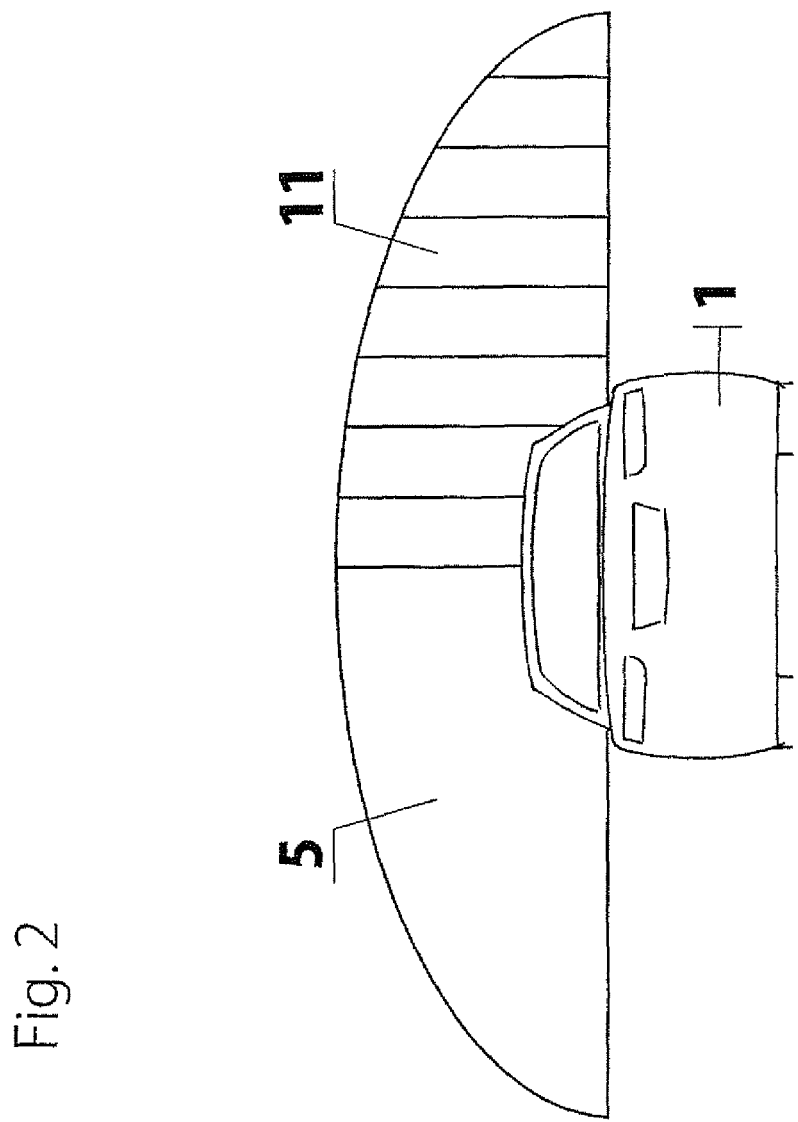
FIG. 2: shows asymmetrical ADB in the high-beam mode.

FIG. 2 shows the inventive concept of the asymmetrical ADB of the vehicle 1 with the right wing as the ADB illumination area 11 and the left wing as the high-beam light area 5, the standard high-beam area. Thus, the ADB functionality is limited to and/or concentrated on the essential area, namely the right wing of the illuminated area as ADB illumination area. This concentration is accompanied by a substantial simplification of the technical implementation of the ADB functionality. The number of LEDs required for the ADB functionality can be reduced by half, which leads to more. Thus, for example, the cooling capacity for the LEDs can be reduced, resulting in energy savings that can be used to save fuel or, in the case of electric mobility, to increase the range of the vehicle. Furthermore, the required installation space and not least the weight of the vehicle components can be reduced.

An important aspect is the simplification of the software for controlling and regulating the ADB functionality. This reduces the susceptibility to interference and thus increases the functional and operational safety.

A significant advantageous aspect is also that the asymmetrical ADB reduces, by virtue of constant brightness, adaptation problems of the driver's eyes due to switching to low-beam and high-beam. The driver is therefore less tired.

The use of the ADB functionality asymmetrically on the right wing combines the advantages of the ADB functionality, namely that, for example, reflective signs can be masked as sources of interference and that dangerous situations are better recognizable with a stronger right wing, with the advantage of lower expenditures and costs, so that as a result the ADB functionality can be provided to a larger number of vehicles.

FIG. 3 shows the asymmetrical ADB of the vehicle 1 according to FIG. 2 in the case of an oncoming vehicle 3. The right wing of the light is shown as ADB illumination area 11 with an additional high-beam in the oncoming vehicle 3, whereas the left wing of the light is shown as the low-beam area 4. There is thus a simple switchover for the left wing from high-beam to low-beam in the case of an oncoming vehicle.

Figure 4:
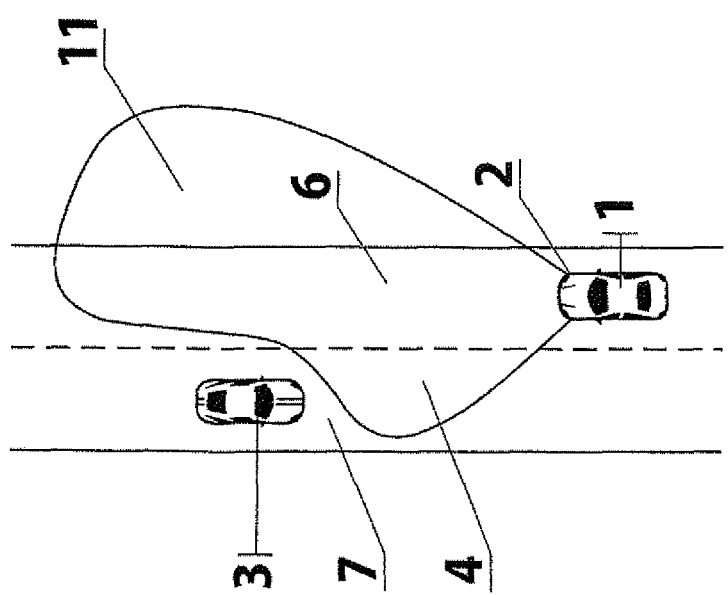
FIG. 4: shows an illumination range of the asymmetrical, glare-free high-beam for a straight course of the road.

FIG. 4 shows schematically the illumination area of the asymmetric, non-glare high-beam for a straight road. In the example, a road with right-hand traffic is shown and it can be seen that the concept of the asymmetrical, glare-free high-beam can also be designed accordingly for left-hand traffic. In contrast to the standard ADB according to the prior art, the area illuminated by the vehicle 1 is not double-winged, but has a mirror-symmetric L-shaped design in the direction of travel.

The vehicle 1 with headlights 2 travels on its own lane 6. The illumination range of the headlights 2 is formed from the low-beam area 4 as the left wing and the ADB illumination area as the right wing. The low-beam area 4 is located in the area of the oncoming traffic lane 7 so as not to blind the oncoming vehicle 3. The ADB illumination area 11 is located in the area of its own traffic lane 6, since there are no other vehicles present. The full functionality of the ADB technology is maintained in the ADB illumination area 11, so that an impairment of road users can be prevented even in the event of a sudden appearance.

Figure 5:
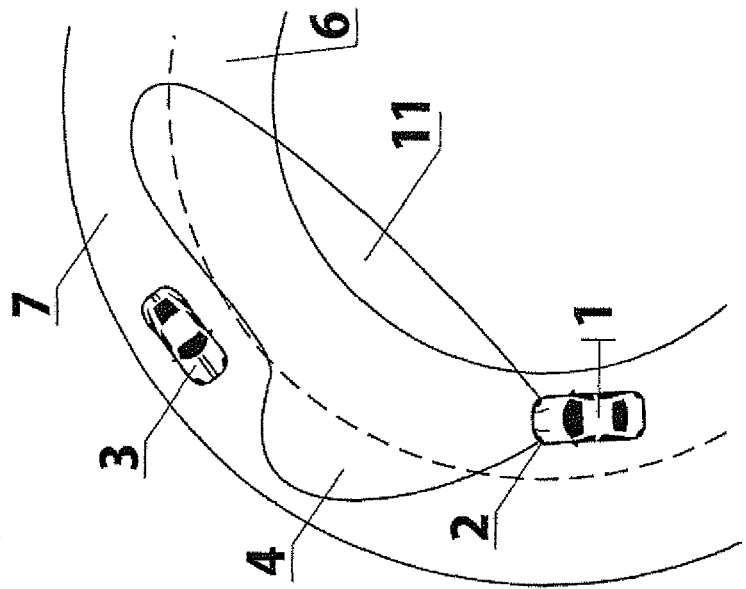
FIG. 5: shows an illumination range of the asymmetrical, glare-free high-beam for a curved course of the road.

FIG. 5 shows a situation similar to that in FIG. 4, with the road showing a curve to the right. The asymmetric ADB technology is combined with the AFS technology of the adaptive cornering light. Especially for this application mode, it is particularly advantageous to use the information from an onboard navigation system for the predictive control of the combined AFS and the asymmetric ADB of the right wing. In this case, the known upcoming turning radius can be taken into consideration without delay in the control.

Figure 6:
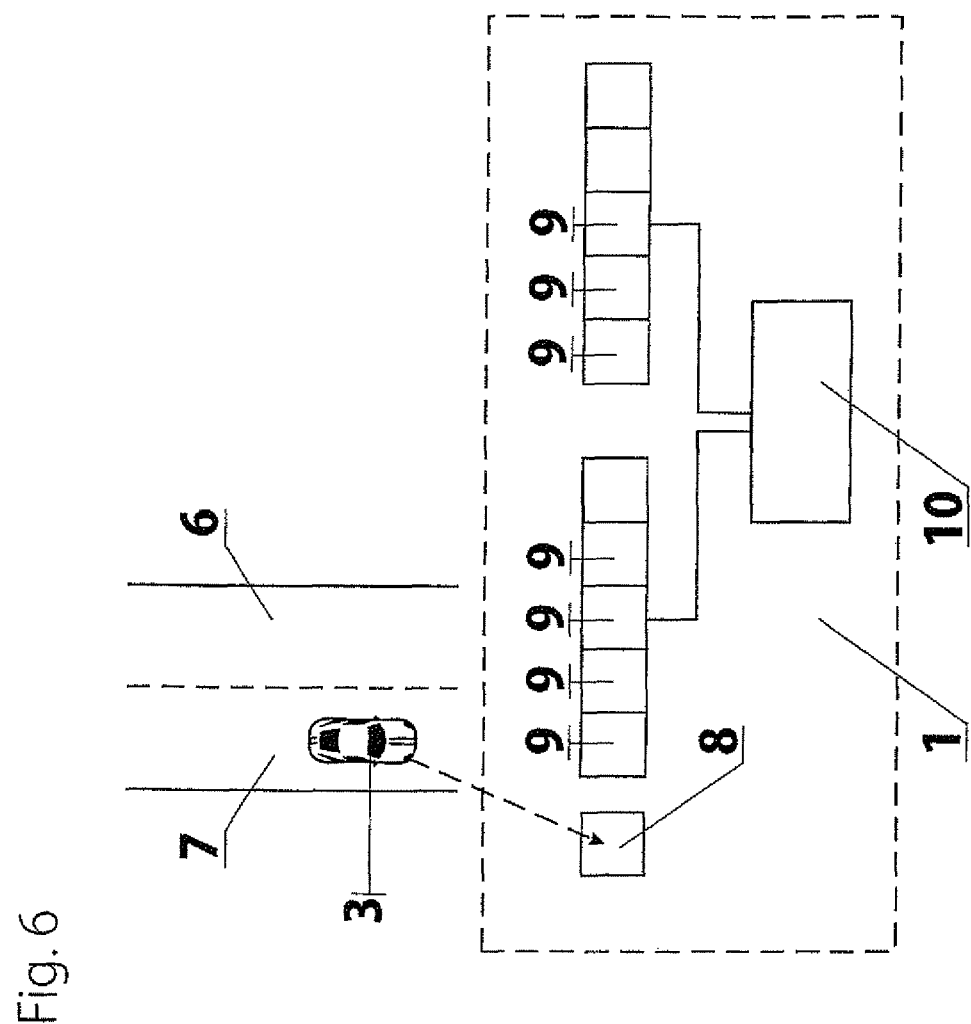
FIG. 6: shows a schematic diagram of the components of the asymmetrical, glare-free high-beam.

FIG. 6 shows schematically the arrangement for producing the glare-free high-beam. The oncoming vehicle 3 on the oncoming lane 7 is detected by the camera 8 and identified as a vehicle whose driver should not be disturbed by the high-beam. The camera 8 is connected to the ADB control and regulating unit 10 and supplies the corresponding information thereto. The LEDs 9 of the headlights of the vehicle 1 are controlled by the ADB control and regulating unit 10 and illuminate the oncoming lane 7 accordingly with a low-beam and the own lane 6 as an ADB illumination area, as shown in FIG. 4. The arrangement for the asymmetrical, glare-free high-beam with the components camera 8, LED 9 and ADB control and regulating unit 10 is arranged in the vehicle 1 and is shown in FIG. 6 schematically on an enlarged scale as a unit enclosed by a dashed line.

The use of a camera 8 for the asymmetric ADB of the right wing provides various advantages compared to other light-sensitive sensors for the ADB functionality. Usable cameras 8 have an image capture frequency of 25 to 50 images per second. The resolution of the available cameras 8 is sufficiently high to detect objects at a distance of up to one kilometer in front of the vehicle 1 and to make, after evaluation of the images, a reliable distinction between stationary and moving objects.

While the invention has been illustrated and described as embodied in a vehicle head light, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An arrangement for generating a glare-free high-beam for vehicle headlights comprising,
   a plurality of LEDs controllable by an Adaptive Driving Beam (ADB) control and regulating unit,
   a front camera connected with the ADB control and regulating unit and configured to transmit information about oncoming and/or preceding vehicles to the ADB control and regulating unit,
   wherein the vehicle headlights are configured for generating an asymmetric ADB illumination area only for an area of an own lane and wherein for an area of an oncoming lane, the headlights generate only a low-beam area and a high-beam area, and
   wherein the number of LEDs in the headlights for the area of the oncoming lane to be illuminated is reduced to one half compared to the number of LEDs for the areas to be illuminated for the own lane.

2. The arrangement according to claim 1, wherein the camera is configured to capture 25 to 50 images per second.

3. A method for producing an asymmetrical, glare-free high-beam for vehicle headlights comprising the following steps,
   separately regulating and controlling a plurality of LEDs of a vehicle headlight and controlled and regulated by an ADB unit for illuminating an oncoming lane and an own lane of a road, and
   upon detecting oncoming vehicles by a front camera, the oncoming lane is switched to low-beam, and the own lane is switched to high-beam and remains in ADB mode, and/or
   when detecting preceding vehicles by the front camera, the own lane is switched to low-beam and remains in the ADB mode and the oncoming lane is switched to high-beam, and
   when no vehicles are detected by the front camera, the oncoming traffic lane is switched to high-beam and the own traffic lane operates in ADB mode.

4. The method according to claim 3, further comprising the step of configuring the ADB function of the glare-free high-beam in combination with an Adaptive Front-Light System (AFS) function of an adaptive cornering light.

5. The method according to claim 4, wherein upon cornering towards the oncoming lane, the ADB function for the own lane is turned off, switching back to low-beam.

6. The method according to claim 3, further including information from a navigation system for controlling and regulating the light beam.

* * * * *